United States Patent Office

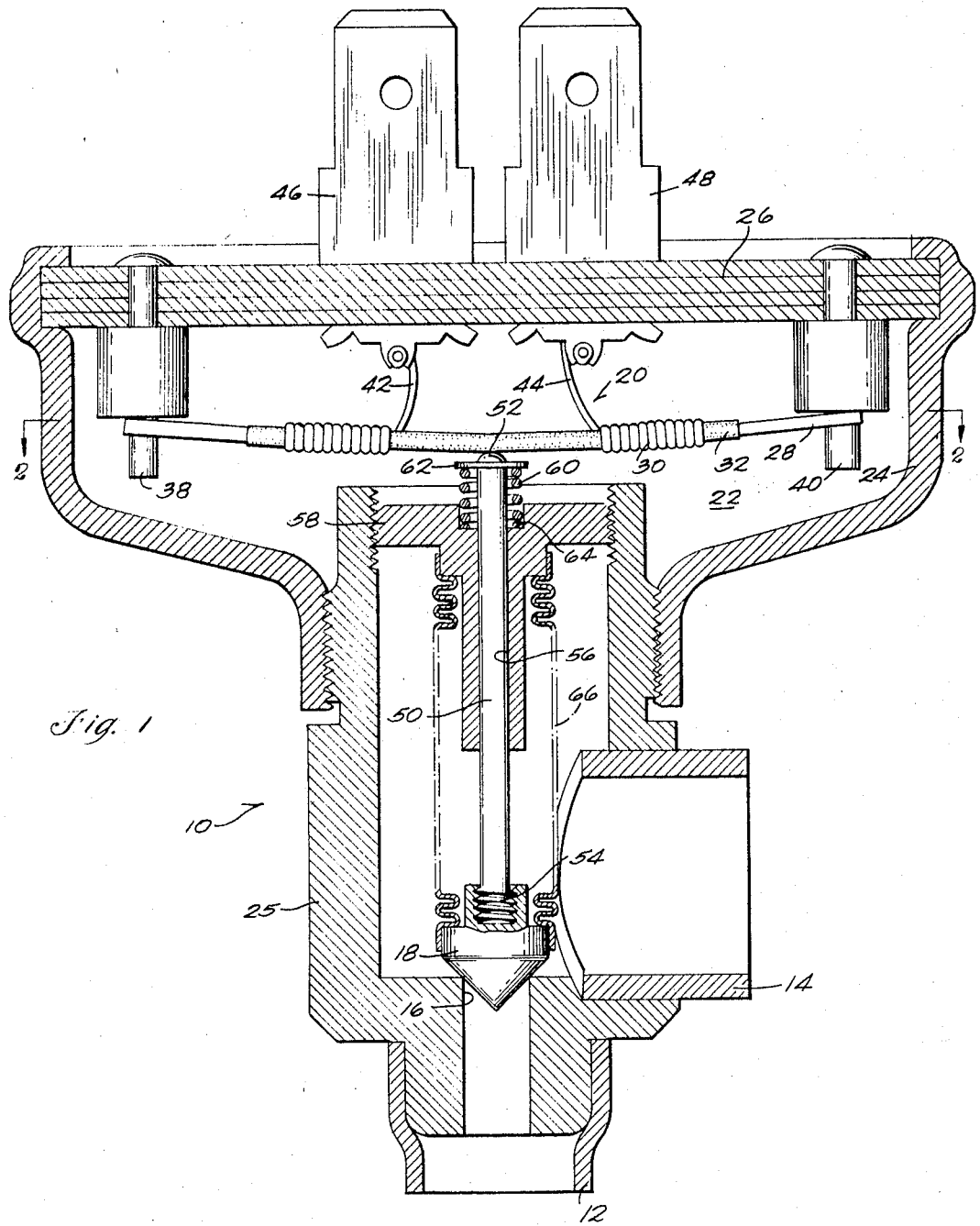

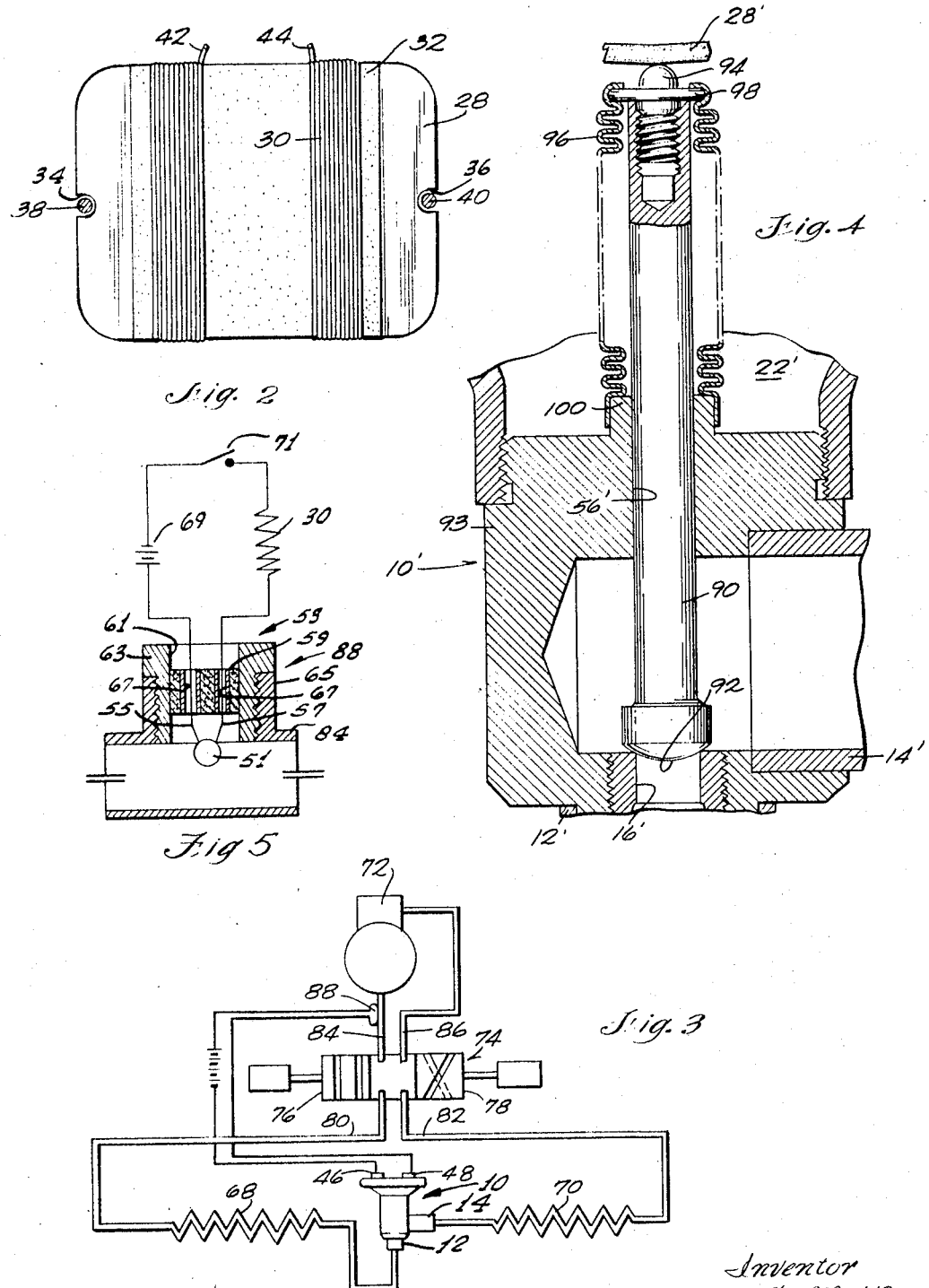

3,464,227
Patented Sept. 2, 1969

3,464,227
EXPANSION VALVE AND HEAT PUMP SYSTEM
Alan A. Matthies, Milwaukee, Wis., assignor to Controls Company of America, Melrose Park, Ill., a corporation of Delaware
Continuation of application Ser. No. 664,009, Aug. 29, 1967. This application July 22, 1968, Ser. No. 752,119
Int. Cl. F25b 29/00, 41/04; F16k 31/02
U.S. Cl. 62—225                                16 Claims

ABSTRACT OF THE DISCLOSURE

This disclosure relates to a heat motor actuated expansion valve for a refrigeration system wherein valve operation is achieved by a combination heater and bimetal, or other thermally responsive member, and wherein the movable valve element is preferably an elongated needle valve connected to the bimetal. The bimetal moves in accordance with heater energization and produces needle valve movement relative to a restricted orifice to thereby regulate refrigerant flow. One end of the needle valve is exposed to system pressure and the opposite end, which is connected to the bimetal, is exposed to the bimetal ambient. A bellows surrounds a portion of the needle valve and is positioned operationally between the flow passage, system pressure, and the bimetal. The bellows provides a hermetic seal between system flow and the bimetal while permitting free movement of the needle valve. The valve, with the bellows, is effective to accommodate refrigerant flow in opposite directions through the valve. A single valve of this type is thus adapted for connection in a heat pump system to control flow in either direction of heat pump operation. The heat motor operator of the valve is controlled on the basis of an electrical input and preferably this input is controlled through a circuit including a thermistor exposed to the condition of the system refrigerant.

---

This application is a continuation of my co-pending application Ser. No. 664,009, filed Aug. 29, 1967, now abandoned and assigned to the assignee of this application.

BACKGROUND OF INVENTION

Field of invention

This invention relates to expansion valves for use in refrigeration systems and to heat pump systems utilizing such valves.

Description of prior art

Presently, pressure operated diaphragm expansion valves are widely used in the refrigeration field. Because of their mode of operation (being operated on the basis of pressure differential), they require evaporator pressure (suction line pressure) on one side of the diaphragm and hence are not reversible. Heat motor operated valves have been proposed which utilize a heater-bimetal arrangement to actuate the valve and do not rely on pressure differentials. Even these heat motor valves are not completely acceptable from a reversibility standpoint as they have not been able to adequately isolate the heat motor operator from refrigerant under conditions of bi-directional flow through the valve. Therefore, one of such prior valves, either heat motor or diaphragm operated, has not been capable of controlling the bi-directional flow encountered in a heat pump system. For this reason, two such valves have usually been required in a heat pump system to accommodate the reversible flow. In addition to two expansion valves being required, the systems were further complicated. For example, when using pressure operated valves a check valve was required with each expansion valve to accommodate the flow in a reverse direction which the valve itself was not capable of accommodating. Also, each expansion valve usually required a separate sensor exposed to refrigerant for controlling the valve on the basis of refrigerant condition. Moreover, in the case of heat motor operated valves attention had to be directed to proper orientation of the valve, the heat motor being positioned above the system flow passage to minimize refrigerant seepage to the heat motor.

Heat motors have been used as actuators for expansion valves. Bellows have been used in refrigeration system valves and in environments other than refrigeration valves, see U.S. Patents 2,659,569, 2,587,480, 2,719,673, and 2,733,595 which utilize a bellows in various manners such as part of the valve actuator or to achieve a hermetic seal of one type or another.

SUMMARY OF INVENTION

This invention relates to an expansion valve construction wherein the heat motor operator of the expansion valve is physically isolated and sealed from refrigerant flow. Preferably a flexible sealing element, such as a bellows, is positioned operationally between system flow and the heat motor operator and achieves a hermetic seal between system flow and the operator.

When the valve is connected in a system having bi-directional flow, the valve element is exposed to wide differentials in pressure as a result of flow reversal. In one instance one side of the valve element is exposed to evaporator pressure and on reversal that side is exposed to compressor head pressure. The bellows, on other pressure sensitive element, also responds to the pressure reversal and produces a force which counteracts the effect the pressure reversal might otherwise have on the valve element.

In its more specific aspects, a single valve of this type is connected in a heat pump system between the two coils of the system. With the above defined construction the valve accommodates flow in opposite directions through the valve without danger of refrigerant contacting the heat motor and without regard for the relative orientation of the expansion valve. The heat motor is controlled electrically and, preferably, this control is achieved with a circuit including a thermistor. The thermistor is exposed to the refrigerant in the system and achieves control on the basis of the condition of the refrigerant.

DESCRIPTION OF DRAWINGS

FIG. 1 is a section view of an expansion valve incorporating this invention;

FIG. 2 is a section view generally along line 2—2 of FIG. 1;

FIG. 3 is schematic illustration of a heat pump system incorporating an expansion valve of FIG. 1;

FIG. 4 is a partial section of an expansion valve incorporating an alternative arrangement of this invention;

FIG. 5 is an enlarged, generally schematic view of the thermistor assembly and its associated circuit elements.

DESCRIPTION OF PREFERRED EMBODIMENT

In FIG. 1, an expansion valve is illustrated as including valve body 10, couplings 12 and 14 connected to the body and a passage between the couplings including restricted orifice 16. Valve element 18 is movable relative to the orifice to control refrigerant flow. Heat motor operator assembly 20 is arranged in chamber 22 defined in the valve body by funnel shaped valve body element 24 threaded into portion 25 and closure plate 26 connected to element 24 by a rolled or crimped connection as illustrated. Structurally the heat motor is preferably made up of bimetal element 28 and heater 30 wrapped on the bimetal. The bimetal has a normal or "cold" position as illustrated in FIG. 1 and the heater, being in heat transfer relation with the bimetal, is capable of heating the bimetal to cause it to bow upwardly from its "cold" position. Coating 32 is provided between the heater and the bimetal to achieve electrical insulation but is made of a suitable material (for example Teflon) and is relatively thin so as not to interfere with heat transfer between the heater and the bimetal. Structurally bimetal 28 includes opposite notches 34 and 36, see FIG. 2, which are engaged on shouldered stainless steel pins 38 and 440 connected to plate 26. The pins provide a bimetal support which is effective to hold the desired bimetal orientation during bimetal flexure and without interfering with bimetal movement. Coil 30 is a continuous winding and its ends 42 and 44 are connected to terminals 46 and 48 projecting from panel 26.

Elongated stem 50 extends between the heat motor operator and valve element 18. End 52 of the stem engages the bimetal while the opposite end 54 is fixed to valve element 18, for example by the illustrated threaded connection. The stem is supported for axial movement in opening 56 of an insert 58 threaded into valve body portion 25. As will be seen from the discussion hereinafter, system pressure will generally have some tendency to urge the valve element and stem toward engagement with the bimetal so that the stem and valve will follow bimetal movement. Compression spring 60 is seated between washer 62 carried by the stem and shoulder 64 in insert 58 to insure continuous engagement between the stem and bimetal and following movement of the stem.

Couplings 12 and 14 are connected in the refrigeration system so that the refrigerant flows through the valve. The position of valve element 18 with respect to orifice 16 determines the amount of refrigerant flow and this position is dependent upon the operational state of the heat motor operator. The operative state of heat motor assembly 20 is preferably controlled by a thermistor arrangement 88 shown in a general manner in FIG. 3 and in more detail in FIG. 5. A thermistor 51 is suspended in conduit 84 (shown broken and enlarged in FIG. 5) from a terminal assembly 53 by thermistor leads 55 and 57. Terminal assembly 53 may comprise the illustrated arrangement of an electrical and thermal insulating member 59, such as glass or ceramic, fixed in a bore 61 of plug 63 threaded into coupling 65 in conduit 84. Metallic tubes 67 are positioned in axial openings of member 59 and thermistor leads 55 and 57 are soldered to tubes 67. Member 59 thermally and electrically isolates thermistor 51 from the structural elements of the system and with this arrangement the thermistor will be self-heating when energized from electrical source 69. The current in heater 30 of the heat motor is common with that in the thermistor so that the current in heater varies with current in the thermistor which is in turn dependent upon the resistance of the thermistor. Thermistor 51 may have a negative temperature coefficient of resistance so that as the temperature of the thermistor increases its resistance decreases. Accordingly, when in a gaseous environment the thermistor will self-heat when energized by source 69 thereby reducing the resistance of the thermistor and increasing the current in heater 30 to drive the valve open. When an excess of refrigerant is supplied, liquid refrigerant will be entrained in the refrigerant flowing past the thermistor. The liquid refrigerant will cool the thermistor, increasing its resistance and decreasing the current in the heater to drive the valve toward a closed position and thereby reduce the amount of refrigerant flow. Switch 71 affords control over the operation of the control circuit which, since it is not necessary to a thorough understanding of this invention has been illustrated schematically.

The valve constructed in accordance with this invention, is particularly adapted for operation in a heat pump system. In such a system refrigerant can be made to flow selectively in opposite directions depending upon whether the system is to provide a heating or cooling function. Generally, prior proposed heat motor operated expansion valves are not adequately suited to accommodate the pressure differentials attendant flow reversal in such systems and hence can only adequately accommodate flow in one direction and are not reversible. Generally, leakage of refrigerant into the heat motor operator area can occur upon the flow reversal and impingement of refrigerant on the heat motor will produce a radical cooling of the operator and detrimentally affect operation. Proper operation in a heat pump system with prior expansion valves, either heat motor or pressure operated, generally requires a relatively complex valve arrangement. For example, with pressure operated valves specifically two such valves are required together with a check valve in association with each expansion valve to accommodate flow in a reverse direction which the expansion valve itself cannot accommodate. Also, such systems require separate sensors for each of the expansion valves.

One of the problems encountered in the use of expansion valves in a heat pump system and particularly where the valve is operated by a heat motor, is the inability of the valve to accommodate the pressure reversals experienced in the system without at least some leakage of refrigerant into the heat motor operator area and radical cooling of the heat motor operator with resulting premature valve movement toward a closed position. This invention solves this problem by providing a hermetic seal between the heat motor and system flow. As illustrated in FIG. 1, a flexible seal, bellows 66, surrounds stem 50. The bellows has a sealed connection to valve element 18 and also to insert 58 which is a part of the valve body and serves to separate the heat motor operator from the flow passage. For example, a solder connection could be used to connect the bellows to both valve element 18 and insert 58. This provides a hermetic seal around the stem and between system pressure and the heat motor operator. More specifically, the threaded connection between insert 58 and body portion 25 being a fixed connection can be easily sealed with the use of expoxy or the like. The only moving connection is between stem 50 and insert 58 and this is sealed by bellows 66 which is thus placed operationally between system pressure and the heat motor and will prevent refrigerant leakage through opening 56 to the heat motor operator.

A further advantage in the use of bellows 66 is that it is a pressure sensitive element and in effect tends to counteract forces imposed on the valve element due to the changes from evaporator to head pressure which occur as a result of flow reversal. Before discussing this feature, reference will be made to FIG. 3 for a brief description of the heat pump system. The expansion valve is connected between coils 68 and 70 and the coils are connected to compressor 72 through a four-way reversing valve 74. The reversing valve is a closed center valve with reversing ports provided in its end sections 76 and 78. In the position illustrated in FIG. 2, flow is interrupted between the compressor and the coils. When section 76 is brought into registry with conduits 80, 82, 84 and 86, coil 68 in effect becomes an evaporator coil and coil 70 becomes the condenser so that coil 68 can be utilized to achieve a cooling operation. When section 78 is brought into registry with the conduits, coil 70 becomes the evaporator and coil 68 becomes the condenser and a heating function can be achieved. In both of the variations it will be noted that conduit 84 is the suction line of the system, and in this respect, thermistor 88 can be connected to the suction line as illustrated to control the operator state of the heat motor.

With this brief description of the heat pump system in mind, it will be noted that in one position of valve 74, coupling 12 is exposed to evaporator line pressure and coupling 14 is exposed to head pressure namely where section 76 is in registry with the conduits, and the reverse pressure condition exists when section 78 is brought into registry. The pressure drop across the valve orifice from head pressure to evaporator or suction line pressure can be quite large which results in a wide variation in the pressure around the valve and valve stem. For example, in a typical installation suction line pressure may be on the order of 40–60 pounds whereas head pressure could be on the order of 300 pounds. In either pressure condition the bellows seals the heat motor operator from system flow and pressure. When the head pressure is applied to coupling 12 it will tend to open valve element 18, but it must act against the bimetal which is relatively strong and can hold the valve element shut. With this pressure condition the valve stem and element are urged toward and tend to follow the bimetal. When the pressure reversal occurs, coupling 14 connected to head pressure and coupling 12 to evaporator or suction line pressure, the 300 pound pressure is acting around the valve element and will tend to urge the valve closed which would have a tendency to prevent the valve and stem from following bimetal movement. The bellows also responds to this increased pressure and produces a force tending to counteract the effect of the pressure reversal on the valve element. It is believed that under the influence of pressure the bellows tends to collapse axially thereby exerting a force on the valve element tending to lift the valve element, and urging it to follow the bimetal, and counteracting the closing effect of the higher pressure.

This valve is capable of effectively accommodating flow in either direction between its conduits 12 and 14 and without danger of leakage of refrigerant into the heat motor chamber. It has also been found that the hermetic seal provided between system flow and the heat motor provides a multi-poise valve and permits the expansion valve to be operated in any one of a number of various positions and is not necessarily limited as prior heat motor operated expansion valves to an upright position with the heat motor operator above system flow.

FIG. 4 illustrates an alternate construction for the expansion valve. In the valve of FIG. 1 the bellows was directly exposed in the system flow path whereas in this embodiment the bellows is positioned in the heat motor operator chamber. For convenience in illustration only a portion of the valve has been illustrated and this should be sufficient for an understanding of this alternative construction. Structurally the valve includes body 10' with an orifice 16' being provided between couplings 12' and 14'. The movable valve assembly in FIG. 4, similar to that of FIG. 1, is again a needle type valve but in this illustration consists of an elongated valve stem 90 terminating in an integral semi-spherical head 92 which seats an orifice 16'. Valve stem 90 extends through opening 56' in the valve body portion 93 and into the heat motor operator chamber 22'. The end 94 of the valve stem engages bimetal 28'. In this arrangement bellows 96 extends between a washer 98 connected to the valve stem and shoulder 100 formed in valve body portion 93. Again the opposite ends of the bellows can be joined to the valve body and the valve by a sealed connection, for example by soldering, and a hermetic seal is achieved between system flow, and the heat motor operator chamber. Again in this alternative the bellows tends to counteract forces occurring due to pressure reversals which occur as a result of flow reversal. In this embodiment it will be noted that the interior of the bellows it exposed to the stem pressure and this pressure is virtually always acting in a direction tending to urge the stem end 94 into engagement with bimetal 28', that is in an opening direction. System pressure always acts to expand the bellows and when the increased head pressure occurs it tends to expand the bellows causing the stem to follow bimetal 28' and also counteracting any effect the head pressure at coupling 14' might have to close the valve. Again the bimetal is made sufficiently rigid so that in its "cold" position it can maintain the valve closed to flow and can overcome even the substantially high head pressure which will be acting on it.

As a further example of the effectiveness of the seal which is achieved by the bellows, it will be noted that closure plate 26 (FIG. 1) is not made of metal. The plate can be made of fiber because it will not be exposed to any high system pressures. Also, being made of fiber, the panel allows the use of simple terminals 46 and 48 without any further insulation being required. Both of these features represent substantial cost savings.

Although this invention has been illustrated and described in connection with particular embodiments thereof, it will be apparent to those skilled in the art that various changes and modifications may be made therein without departing from the spirit of the invention or from the scope of the appended claims.

I claim:
1. A heat motor operated expansion valve comprising, in combination,
   a valve body,
   means defining a flow passage through said body having an inlet, an outlet and a restricted orifice intermediate said inlet and outlet,
   an elongated valve element extending into said flow passage toward said restricted orifice,
   a heat motor operator in said valve body,
   said valve body including a portion arranged between said flow passage and said heat motor operator and having an opening therein,
   said valve element arranged in and movable axially in said opening,
   said heat motor operator connected to said valve element and operative to vary the position of said valve element with respect to said orifice in accordance with the operative state of said heat motor operator,
   and flexible sealing means extending between said valve body and said valve element and sealing said heat motor operator from said flow passage to prevent flow of flowing medium from said passage to and impingement on said heat motor.

2. The combination of claim 1 wherein said sealing means comprises bellows means having a sealed connection to said valve body and extending to and having a sealed connection to said valve element.

3. The combination of claim 1 wherein
   said opening in said valve body portion is in alignment with said orifice,
   said heat motor is disposed in an area in said valve body defined in part by said valve body portion,
   said valve element including an elongated stem extending from said flow passage through said body portion opening and engaging said heat motor operator,
   and said sealing means comprising bellows means having an extension generally parallel to and generally concentric with said stem.

4. The combination of claim 3 wherein
   said stem has an extension on both the flow passage side and the heat motor operator side of said valve body portion,
   and wherein said bellows is disposed on the flow passage side of said opening.

5. The combination of claim 3 wherein
   said stem has an extension on both the flow passage side and the heat motor operator side of said valve body portion,
   and wherein said bellows is disposed on the heat motor operator side of said opening.

6. A heat motor operated expansion valve comprising, in combination,
   a valve body,
   a flow passage in said valve body,
   valve means supported in said valve body for movement in said flow passage to control flow therethrough,
   a heat motor means connected to said valve means and operative to move said valve means in said passage in accordance with the operative state of said heat motor means, bellows means, and means connecting said bellows means between said flow passage and said heat motor means to hermetically seal said heat motor means from flow in said flow passage.

7. A heat motor operated expansion valve comprising, in combination, a valve body, means defining a flow passage in said valve body and having a restricted orifice therein, a valve element in said flow passage, means supporting said valve element for movement toward and away from said orifice to regulate flow through said passage, a heat motor connected to said valve element and operative to vary the position of said valve element with respect to said orifice in accordance with the operative state of said heat motor, and flexible sealing means extending from said valve body to said valve element and having a hermetic connection to said valve body and valve element to hermetically isolate said heat motor from said flow passage and prevent passage of flow medium from said flow passage to said heat motor operator.

8. The combination of claim 7 wherein said sealing means comprises bellows means having an extension generally parallel to the direction of movement of said valve element relative to said restricted orifice.

9. The combination of the heat motor operated valve of claim 8 in a heat pump system including a compressor, first and second coils and a reversing valve disposed between said compressor and said coils, said heat motor operated valve connected between said first and second coils and accommodating flow in two directions between said coils.

10. The combination of claim 9 wherein said heat motor operator is responsive to an electrical signal for energization thereof, including a control circuit for generating said electrical signal, and also including a thermistor in said control circuit and in heat transfer relationship with said heat pump system so that the electrical signal varies in accordance with the temperature of said thermistor.

11. The combination of claim 10 wherein said thermistor is connected in said heat pump system at the suction line of said compressor.

12. A heat pump system comprising, in combination, a compressor, first and second coils, reversing valve means disposed between said compressor and said coils for controlling the direction of flow through said coils from the discharge side of said compressor to the intake side of said compressor, flow control valve means connected between said coils for controlling flow between said coils, operator means connected to said valve means and, in response to an electrical signal, operating said valve means to determine flow therethrough, a control circuit for said operator means including thermistor means exposed to the condition of said heat pump system on the inlet side of said compressor and controlling the operative state of said operator means on the basis of the temperature condition of said thermistor means which temperature condition corresponds to the condition of said heat pump system.

13. The heat pump system of claim 12 wherein said operator means comprises heat motor means responsive to an electrical input to control the opening of said flow control valve means and said thermistor means controls the electrical input to said heat motor means on the basis of the condition of the refrigerant at said thermistor means.

14. The heat pump system of claim 13 wherein said heat motor means includes heater means connected in circuit with said thermistor means, and thermal responsive means in heat transfer relationship with said heater means and connected to said valve means, said thermal responsive means operative to move said valve means on the basis of the temperature of said thermal responsive means as influenced by said heater means.

15. The heat pump system of claim 14 wherein each of said coils has a first end connected to said flow control valve means and a second end of each coil connected to said reversing valve means, the intake and discharge sides of said compressor connected to said reversing valve means and said reversing valve means operative to connect said second coil ends selectively one to said inlet side and the other to said discharge side, and said thermistor means connected on the compressor side of said reversing valve and on the inlet side of said compressor so that said thermistor means is connected to the suction line of said heat pump system when both of said second coil ends are connected to said compressor inlet side.

16. The heat pump system of claim 12 wherein said operator means comprises heat motor means responsive to an electrical input to control the opening of said flow control valve means and said thermistor means controls the electrical input to said heat motor means on the basis of the condition on the inlet side of said compressor.

References Cited

UNITED STATES PATENTS

| 2,875,780 | 3/1959 | Martin | 62—324 |
| 3,101,094 | 8/1963 | McKenzie | 251—335 |
| 3,108,616 | 10/1963 | Roy | 251—11 |
| 3,205,675 | 9/1965 | Matthies | 62—202 |

WILLIAM J. WYE, Primary Examiner

U.S. Cl. X.R.

62—202, 324; 236—68; 251—335